E. H. LUDEMAN.
VALVE OPERATING MECHANISM.
APPLICATION FILED SEPT. 23, 1915.
1,173,591.
Patented Feb. 29, 1916.
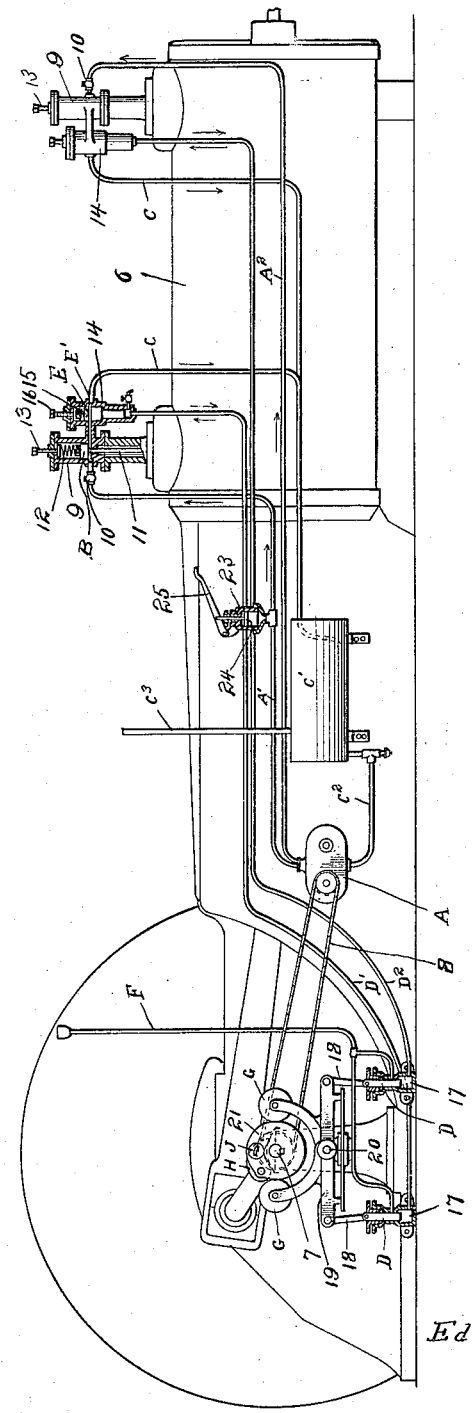
Witnesses
A. E. Newkirk
Inventor
Edwin H. Ludeman
By
Attorney

UNITED STATES PATENT OFFICE.

EDWIN H. LUDEMAN, OF NEW YORK, N. Y.

VALVE-OPERATING MECHANISM.

1,173,591.  Specification of Letters Patent.  Patented Feb. 29, 1916.

Application filed September 23, 1915. Serial No. 52,227.

*To all whom it may concern:*

Be it known that I, EDWIN H. LUDEMAN, a citizen of the United States, residing at New York, in the county of New York and State of New York, have invented certain new and useful Improvements in Valve-Operating Mechanism, of which the following is a specification.

This invention relates to valve operating mechanism for steam engines, and particularly to engines of the reciprocating type, in which the steam inlet valves are periodically operated to admit steam according to the stroke of the engine.

The object of the invention is to provide improved means for operating said valves by fluid pressure devices, and for controlling the operation of such valves by a fluid pressure device which is operated by the engine and which is controlled by a governor or speed responsive device to vary the cut-off. The invention dispenses with the use of ordinary mechanical valve gears for valve operation.

The accompanying drawing is a side elevation partly in section, of one form of the invention, which however may be embodied in various other arrangements.

In the drawings, 6 is the cylinder of a reciprocating engine and 7 the crank shaft thereof, connected in the usual manner. A double-acting engine is shown, but the invention may be applied to a single-acting engine, or any other engine in which steam is admitted at stated periods.

A is a pump, shown as of the rotary type, driven by sprockets and chain 8 from the crank shaft. This pump circulates a fluid under pressure through the pipes A' and A² to cylinders 9 mounted on the valve chest, and return pipes C leading to a reservoir or tank C' communicating with the inlet side of the pump through a pipe C².

C³ is a vent and filling pipe on the tank.

The fluid pressure medium may be oil or other liquid. The lines A' and A² have check valves 10 therein.

A piston B works in each cylinder 9 and is mounted on the stem 11 of each of the main steam inlet valves, said piston being pressed above by a spring 12 with an adjusting screw 13, to normally hold the inlet valve closed. Beyond the cylinder 9 the pipe line is provided with a controlling valve E having a passage E', and working in a casing 14, and normally held in open position by a spring 15 with an adjusting screw 16 behind the same. The valve E is of the piston or plunger type, and pipes D' and D² lead to the lower ends of the casings 14, from cylinders 17 respectively. Each cylinder contains a plunger D connected by a link 18 to a rocker or bell crank lever 19 which is fulcrumed at 20 on the crank shaft frame. One arm of each lever carries a roller G which travels on the periphery of a disk 21 mounted on the crank shaft, and this disk carries a pivoted cam H the position of which is controlled by a governor weight J which operates centrifugally against the tension of any suitable governor spring. The cam H is located in position for the rollers G to run up the same as the disk 21 rotates, and said rollers are held in contact with the disk and cam by springs K acting on the rockers 19.

F is a filler pipe communicating with the cylinders 17, high enough to maintain a head above the height of the valve E.

For starting, each pipe line A' and A² is provided with a cylinder 23 and piston 24 operated by hand lever 25 by means of which pressure may be applied to the fluid in said pipes to lift the piston B and the steam inlet valve.

In operation, the pump A will circulate fluid through the cylinders 9, and when the valves E are opened the fluid will flow freely through the passage in the valves E and back to the pump, without any effect on the inlet valves, which are held closed by the springs 12. When the engine takes up its cycle the cam H operates one or the other of the levers 19 to force down one of the plungers D which by means of the pressure communicated through the pipes D' or D² lifts the corresponding controlling valves E and closes the same. Then, the flow of fluid in the pump circulation is stopped or arrested and it becomes effective against the piston B, lifting the same against the tension of the spring 12 and opening the steam inlet valve to admit steam to the cylinder of the engine, and this valve is held open until the roller G runs off of the cam H when the plunger D will be lifted by the spring K, permitting the valve E to open and relieving the pressure in the cylinder 9 which permits the spring 12 to close the steam inlet valve. The cut-off is controlled by the effective position of the cam H which is governed by the speed responsive device on the crank shaft.

By the means described the inlet valves are opened according to the stroke of the engine, and the fluid pressure means for operating the valve are controlled and operated by fluid pressure means actuated by the engine and the governor. The fluid in the pipes D' and D² flows back and forth under the action of the plungers D, to operate the controlling valves. The fluid operated by the pump circulates freely through the connections described except when its flow is arrested by the controlling valves. A non-compressible liquid is preferably used for the circulating medium in each instance.

The invention may be embodied in a variety of forms and is not limited to the particular structure shown and described.

I claim:

1. In a valve operating mechanism for reciprocating engines, the combination of an inlet valve, a fluid pressure device for operating it, a pump circulating fluid through said device and adapted to operate the same to open the valve when the circulation is arrested, a controlling valve adapted to periodically arrest said circulation according to the stroke of the engine, and means intermittently actuated by the engine according to the stroke thereof to operate said controlling valve.

2. In a valve operating mechanism for reciprocating engines, the combination of an inlet valve, a fluid pressure device for operating it, a pump circulating fluid through said device and adapted to operate the same to open the valve when the circulation is arrested, a controlling valve adapted to periodically arrest said circulation according to the stroke of the engine, and speed-responsive means actuated by the engine to operate said controlling valve according to the stroke of the engine.

3. In a valve operating mechanism for reciprocating engines, the combination of an inlet valve, a fluid pressure device for operating it, a pump circulating fluid through said device and adapted to operate the same to open the valve when the circulation is arrested, a controlling valve adapted to periodically arrest said circulation according to the stroke of the engine, and fluid-pressure means actuated by the engine to operate said controlling valve.

4. In a valve-operating mechanism for reciprocating engines, the combination of an inlet valve, a fluid pressure device for periodically opening the same, a valve controlling the action of the device on the valve, and fluid-pressure means periodically actuated by the engine, according to the stroke thereof, for operating said controlling valve.

5. In a valve-operating mechanism for reciprocating engines, the combination of an inlet valve, a fluid pressure device for periodically opening the same, a valve controlling the action of the device on the valve, and fluid-pressure means periodically actuated by the engine, according to the stroke thereof for operating said controlling valve, and a governor operated by the engine and controlling the operation of said fluid pressure means.

6. In a valve-operating mechanism for engines, the combination with a fluid pressure-operated inlet valve, of a fluid-pressure operated controlling valve controlling the operation of said inlet valve, and means actuated by the engine for periodically producing the pressure to operate said controlling valve.

7. In a valve-operating mechanism for engines, the combination with a fluid pressure-operated inlet valve, of a fluid-pressure operated controlling valve controlling the operation of said inlet valve, and means actuated by the engine for periodically producing the pressure to operate said controlling valve, said means including a speed-responsive device.

8. In a valve-operating mechanism, the combination of an inlet valve, a fluid-pressure device connected thereto, a pump in circuit with and supplying pressure to said device, a normally open controlling valve in said circuit, adapted when open to relieve the pump pressure thereon, and another fluid-pressure device, driven by the engine and operatively communicating with said controlling valve to periodically close the same.

9. In a valve-operating mechanism, the combination of a fluid-pressure operated inlet valve, another valve controlling the operation of said fluid-pressure on said valve, and means for periodically applying pressure to said controlling valve to operate the same, said means including a plunger, a rocker, and a cam driven by the engine and operating on said rocker.

10. In a valve-operating mechanism, the combination of a fluid-pressure operated inlet valve, another valve controlling the operation of said fluid-pressure on said valve, and means for periodically applying pressure to said controlling valve to operate the same, said means including a plunger, a rocker, and a cam driven by the engine and operating on said rocker, and a speed-responsive device driven by the engine and connected to the cam to shift the position thereof.

In testimony whereof, I affix my signature in presence of two witnesses.

EDWIN H. LUDEMAN.

Witnesses:
CHAS. M. RIPLEY,
J. F. KELLERS.